United States Patent
Dunn et al.

(10) Patent No.: US 6,741,599 B1
(45) Date of Patent: May 25, 2004

(54) TELEPHONE SWITCH-INTEGRATED MODEM POOL AND BROADBAND ACCESS CONCENTRATOR PROVIDING IMPROVED LOCAL LOOP DATA NETWORK ACCESS

(75) Inventors: James Patrick Dunn, Sandwich, IL (US); Mark Alan Lassig, Naperville, IL (US); Hsien-Chuen Yu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/507,152

(22) Filed: Feb. 18, 2000

(51) Int. Cl.[7] .............................. H04L 12/28
(52) U.S. Cl. ............... 370/395.6; 370/401; 370/420; 370/466; 375/222; 379/220.01
(58) Field of Search ................. 370/352, 353, 370/354, 355, 356, 395.1, 395.6, 398, 399, 410, 465, 466, 467, 389, 401, 395.5, 395.64, 420, 422; 375/222; 379/220.01

(56) References Cited

U.S. PATENT DOCUMENTS

| 6,160,793 A | * | 12/2000 | Ghani et al. ................. 370/236 |
| 6,452,925 B1 | * | 9/2002 | Sistanizadeh et al. ....... 370/352 |
| 6,542,500 B1 | * | 4/2003 | Gerszberg et al. .......... 370/354 |

* cited by examiner

*Primary Examiner*—Dang Ton
*Assistant Examiner*—Inder Pal Mehra

(57) ABSTRACT

A telephone switch-integrated modem pool and broadband access concentrator provide improved data network access through a PSTN local loop. Rather than simply cascading data as TDM traffic through the PSTN, plural switch-integrated modems, a broadband access concentrator, and a broadband pipe are used to route data traffic between local loop subscribers and one or more data network service providers. Advantageously, point-to-point connections are maintained between subscriber and service provider equipment in order to enable continued use of high level subscriber-provider protocol service negotiation (such as PAP/CHAP, NCP and the like). LCP (link layer) management and translation between the asynchronous subscriber-modem pool link and the synchronous provider-modem pool link are handled transparently by the broadband access concentrator.

21 Claims, 13 Drawing Sheets

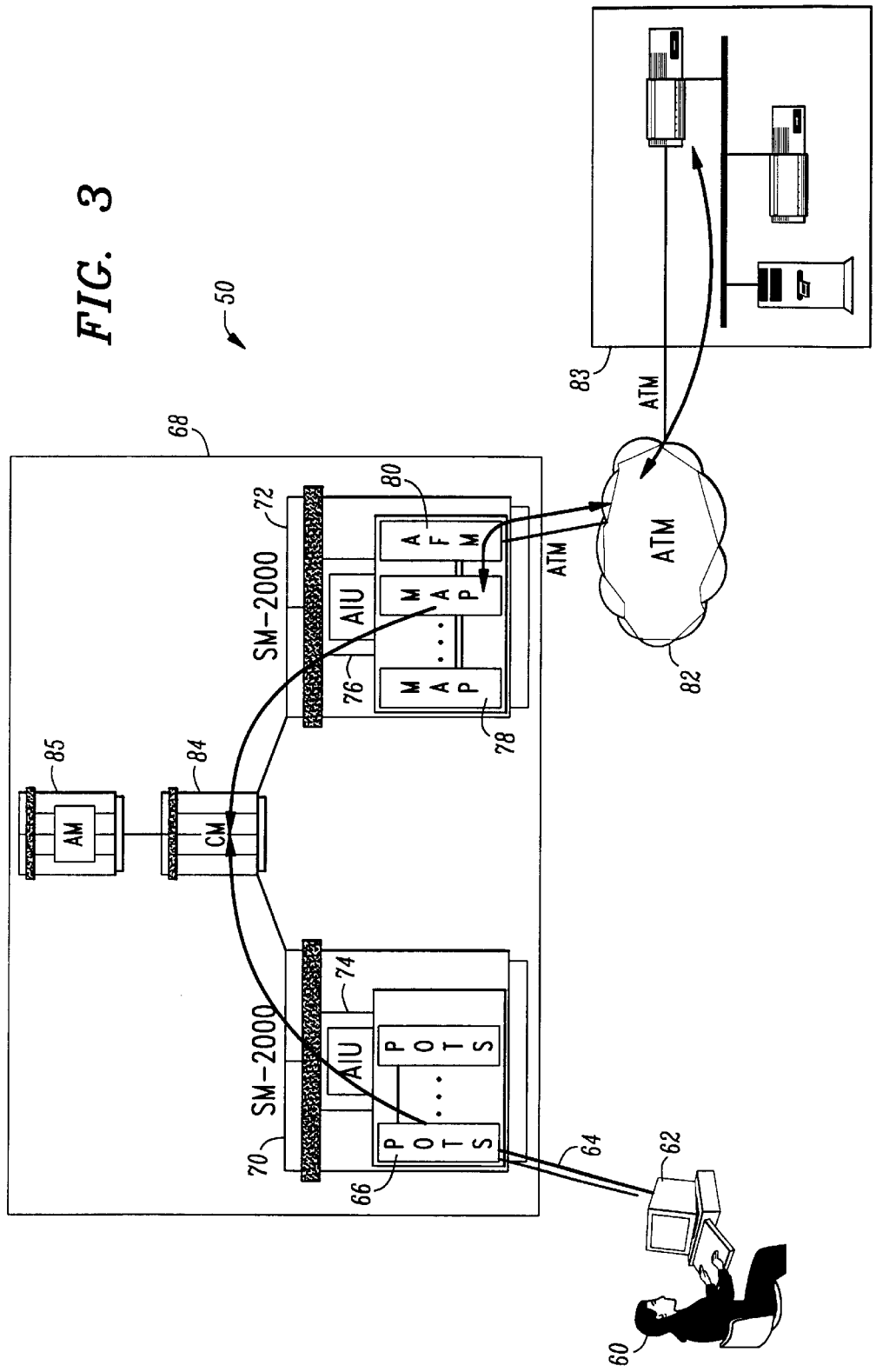

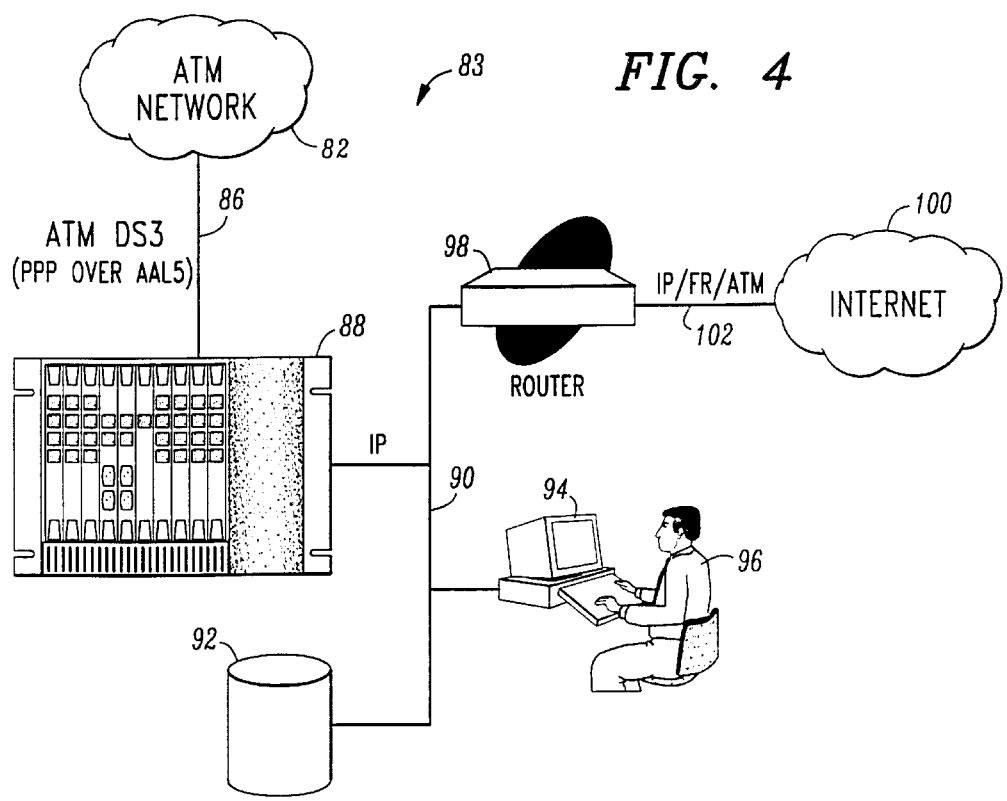

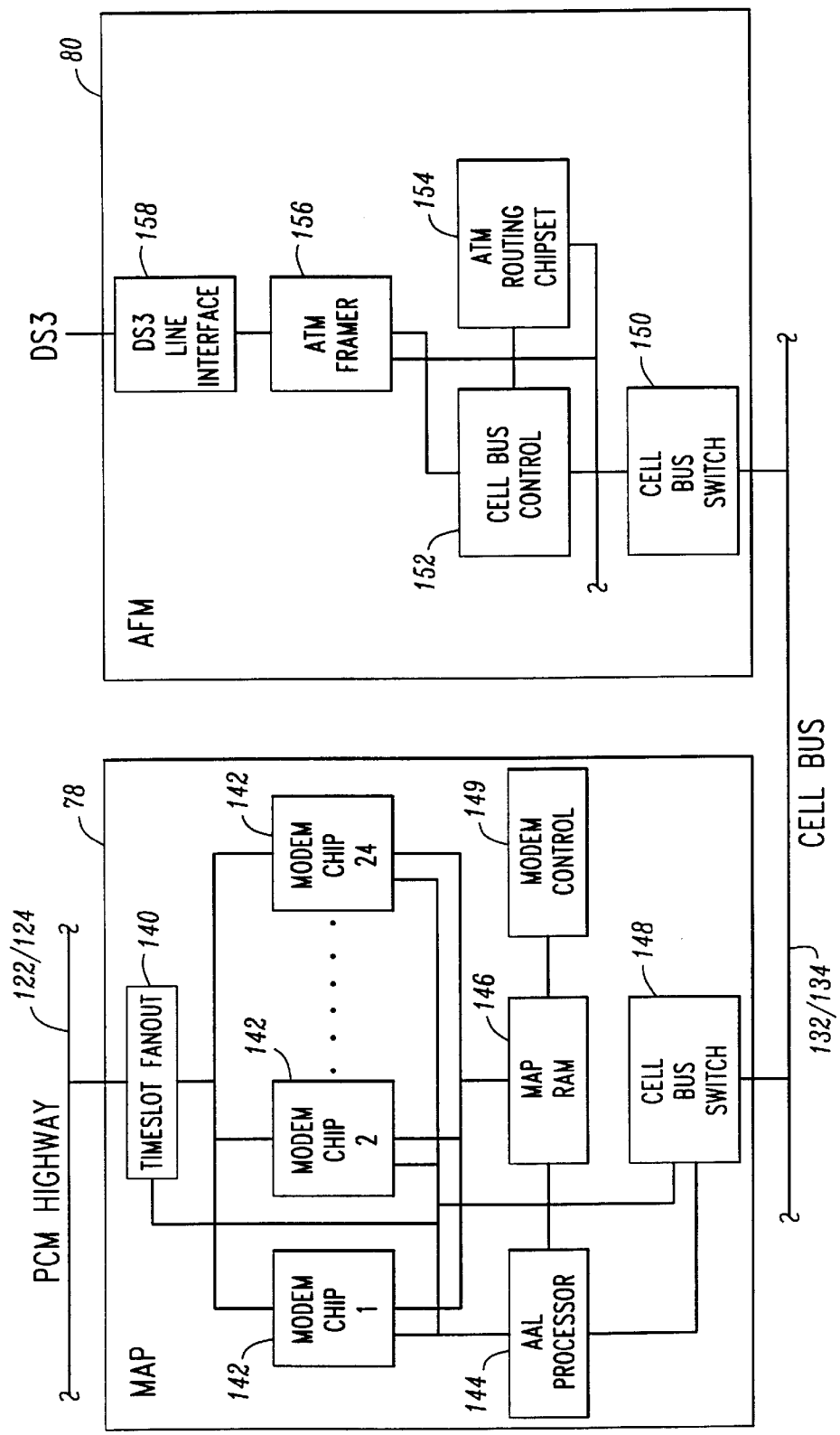

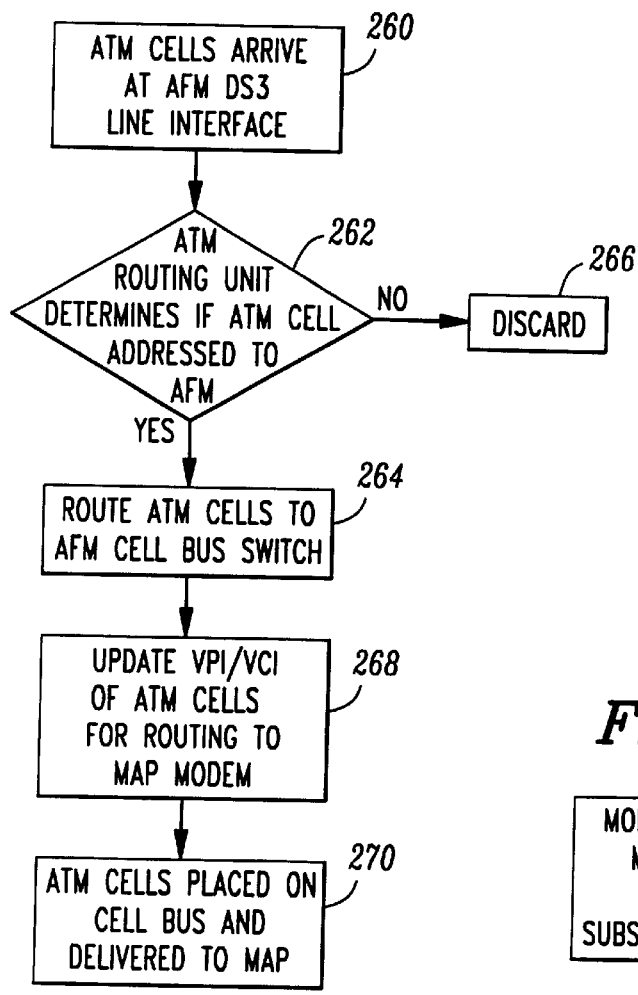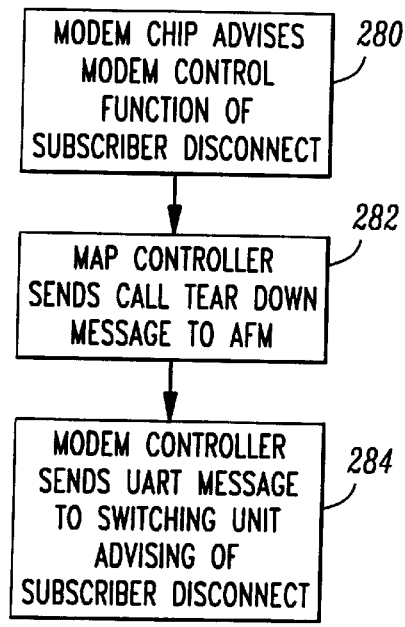

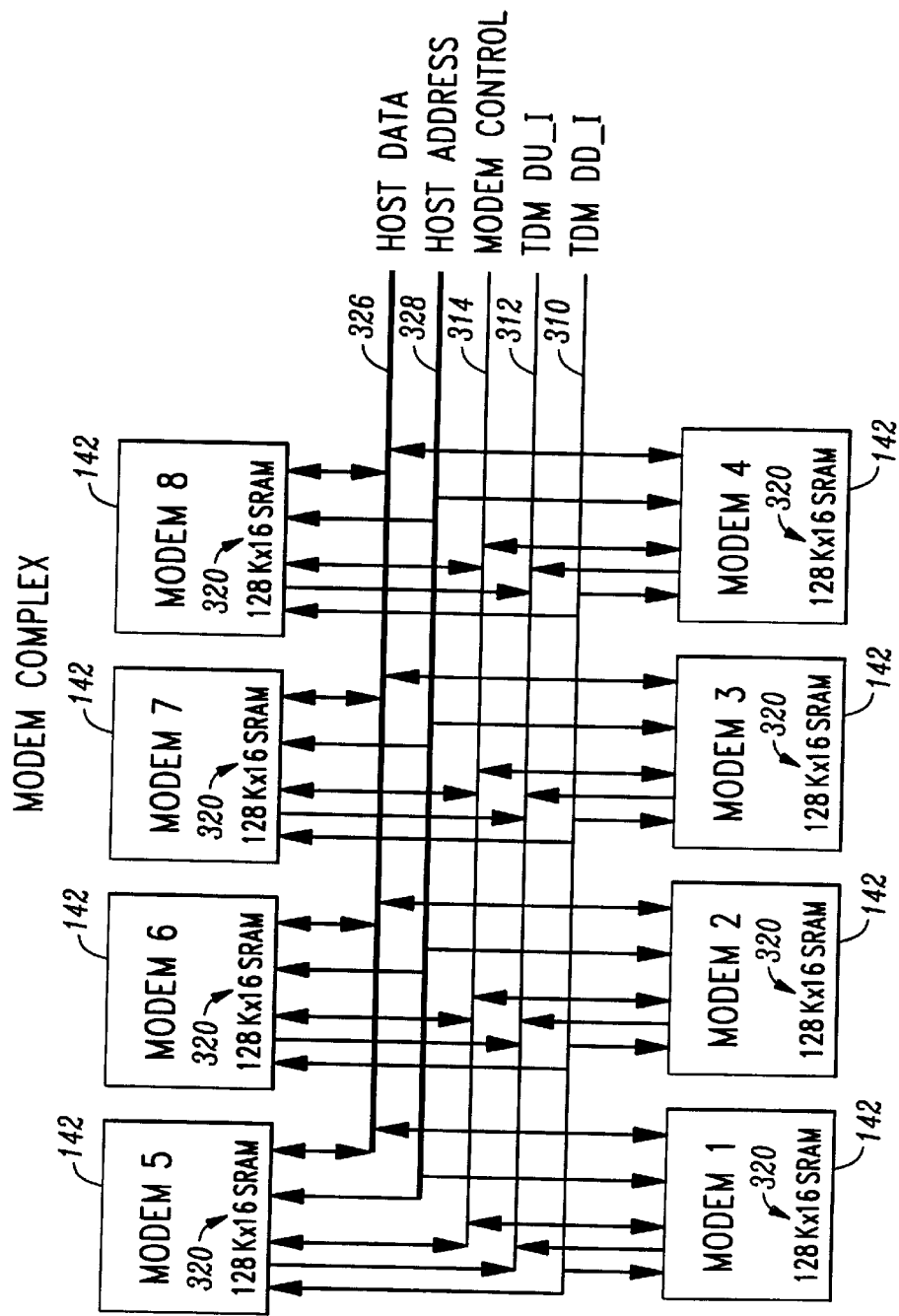

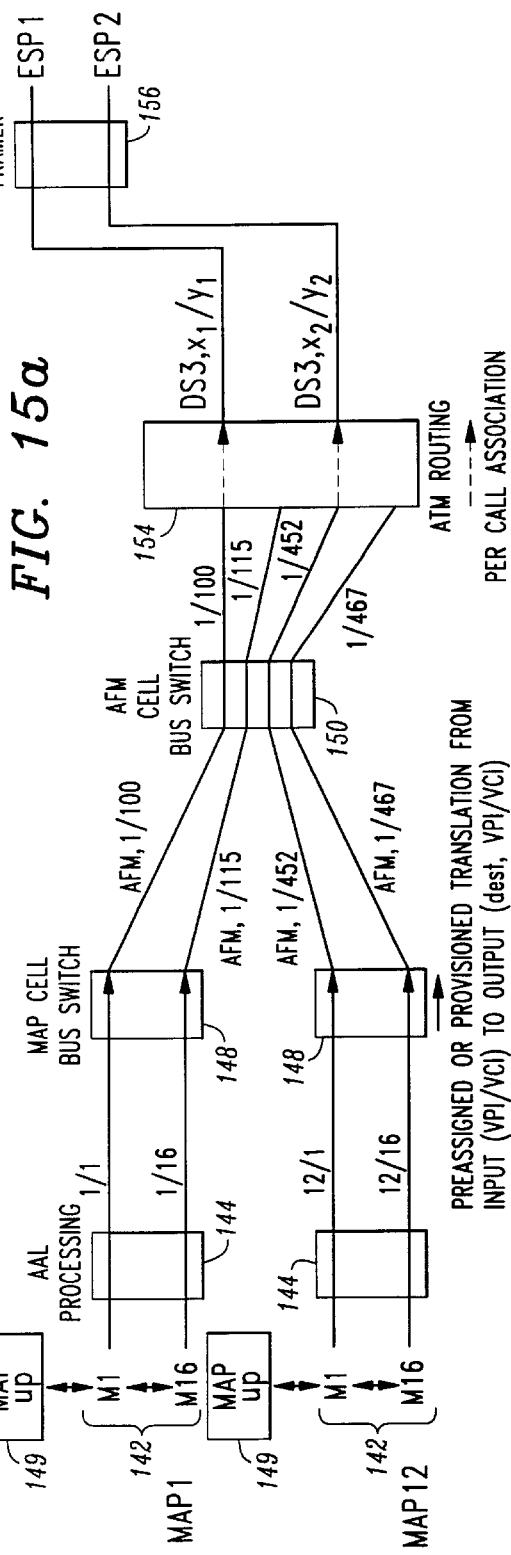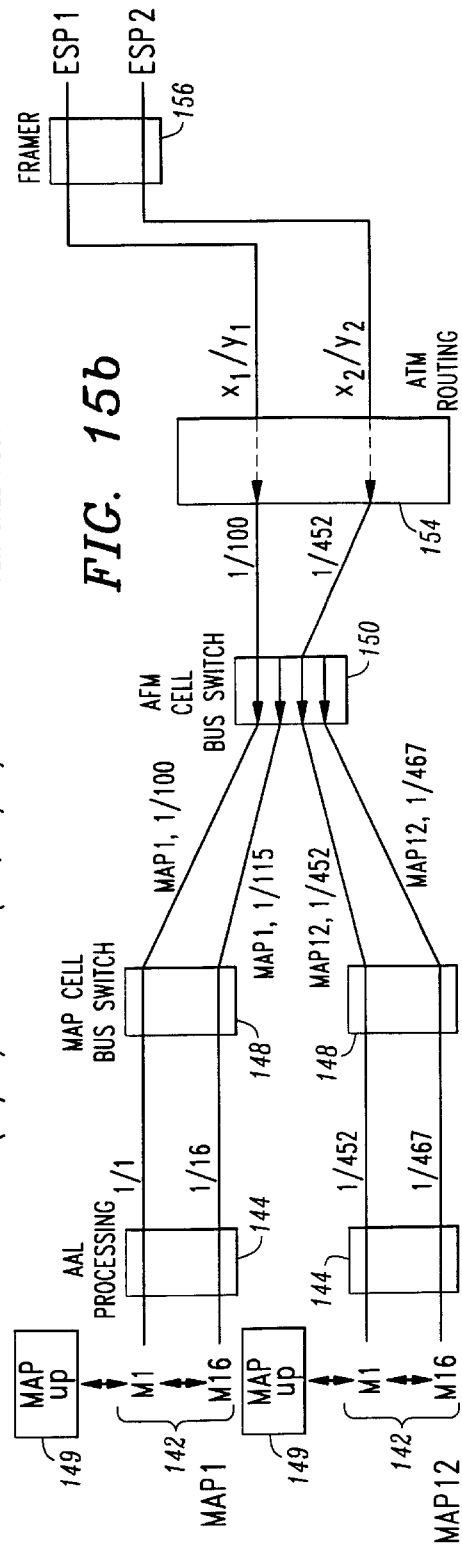
FIG. 15a
FIG. 15b

TELEPHONE SWITCH-INTEGRATED MODEM POOL AND BROADBAND ACCESS CONCENTRATOR PROVIDING IMPROVED LOCAL LOOP DATA NETWORK ACCESS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to data communication through local loop telephone switching equipment. More particularly, the invention concerns a telephone switch-integrated modem pool and broadband access concentrator providing improved local loop data network access in a manner that reduces data-related congestion in the Public Switched Telephone Network (PSTN).

2. Description of Prior Art

The recent explosion in the growth of the Internet, online services, telecommuting, paging, faxing and other data intensive activities has dramatically increased the usage of modems and caused many congestion issues within the PSTN. Data-related congestion problems include high CCS (Centi-Call Second) access blocking at local switches and trunk congestion in the core transport network. These problems stem from the fact that the PSTN infrastructure was originally designed for ordinary voice calls averaging approximately three minutes in length (e.g., 1.8 CCS/hour). The network was built to handle approximately eight users per circuit at an 8-to-1 user concentration, based on the assumption that if there were eight neighbors on a block, only one of them would normally be on the phone at any given time.

Although adequate for many years, the traditional switch utilization assumptions are no longer viable. Telephony carriers are finding that lengthy data calls from Web surfers are tying up local circuits and network trunk systems and blocking or delaying calls from their mainstay voice customers. Users are now vying for today's more precious resources to try to get access to circuits. Sometimes a single household may have voice callers, Web surfers and other modem users, as evidenced by the recent growth in the use of second and third lines. As a result of this combined usage, it is not uncommon to see hold times as high as 20 CCS/hour for originating traffic (subscriber side) and 30–36 CCS/hour for terminating traffic (service provider side). With 36 CCS/hour representing 100% line saturation, it will be appreciated that data-related traffic volumes may easily exceed network limits. With the unpredictable patterns caused by data communication usage, irregular hot spots can develop that overload switch capacity and block multiple lines from dial tone.

Consider further that carrying data traffic through the PSTN is very inefficient and thus wasteful of available bandwidth. When a modem call is carried on a voice circuit through the PSTN, it utilizes an entire 64 kbps timeslot even though the data rate is at most about 52 kbps (in the downlink direction). The uplink data rate is even lower. Also, modem connections are idle over 90% of the time (no transmission of information) and therefore average only about 5–8 kbps out of the available 64 kbps capable of being carried on the connection.

To keep up with data traffic demands, one solution is to add more switching and transport resources. However, this would perpetuate the inefficiencies created by dedicating an entire 64 kbps connection for each modem call. Moreover, the cost of such improvements would be high, and revenues may not be sufficient to cover the investment. As a rule, carriers generate little revenue from data network service providers, whose customers connect to their local PSTN switch for hours at a time via modems. With long hold times threatening customer satisfaction, and increased costs coupled with low revenue affecting profitability, an improved low cost solution is needed for handling data traffic in the PSTN.

SUMMARY OF THE INVENTION

The foregoing problems are solved and an advance in the art is obtained by a novel telephone switch-integrated modem pool and broadband access concentrator providing improved local loop data network access using the Point to Point Protocol (PPP). Rather than simply cascading PPP packets as TDM (Time Division Multiplexing) traffic through the PSTN, the invention utilizes plural switch-integrated modems, a broadband access concentrator, and a broadband pipe to route the PPP traffic between local loop subscribers (hereinafter "subscribers") and one or more data network service providers (also known as Enhanced Service Providers and referred to hereinafter as ESPs). The switch-integrated modems perform demodulation functions but do not terminate the PPP link with the subscriber. Rather, PPP packets are passed to the broadband access concentrator, which uses layer 2 tunneling to pass the PPP packets over a PPP link formed in the broadband pipe using a network layer tunnel connection. Advantageously, point-to-point connectivity is maintained between subscriber and ESP equipment in order to facilitate continued use of high level subscriber-ESP protocol service negotiation (e.g., PAP/CHAP, NCP and the like). LCP (Link Control Protocol) management and translation between the asynchronous subscriber-to-modem pool link and the synchronous ESP-to-modem pool link are handled transparently by the switch-integrated broadband access concentrator.

In preferred embodiments of the invention, the broadband pipe is an ATM pipe and the modem pool includes a plurality of modems. The broadband access concentrator includes an ATM Adaption Layer (AAL) processing function and an ATM User Network Interface (UNI). The modem pool and the broadband access concentrator may be integrated in a device that includes multiple Modem Application Packs (MAPs), each containing plural modem chips and the AAL processing function, and an ATM Feeder Multiplexer (AFM) (implementing the ATM UNI) mounted in respective slots on a common backplane. The first communication link may include a TDM highway bus incorporated on the common backplane and the second communication link may include an ATM cell bus incorporated on the common backplane.

The AFM is configured to establish either a permanent virtual channel connection or, more preferably, a switched virtual channel connection between the modem pool and the service provider system. The AAL processing function in the MAP performs PPP packet encapsulation/unencapsulation into/from AAL5 CPCS (Common Part Convergence Sublayer) PDUs (Protocol Data Units), as well as ATM cell segmentation/assembly. The PPP packet-AAL5 CPCS PDU encapsulation/unencapsulation operation is performed according to a convention known as Multiprotocol Encapsulation Over AAL5, a species of which is the Layer 2 Tunneling Protocol (L2TP). The AAL processing function also negotiates LCP options between the modem pool modems and the subscriber equipment on the first communication link, and between the modem pool modems and the ESP system on the second communication link. The AAL processing function also performs LCP conversions between PPP packets carried over the asynchronous and synchronous links.

The foregoing arrangement provides uplink transmission of PPP packets from the subscriber equipment to the ESP system. In particular, uplink packet transmission includes 1) receiving PPP packets from the subscriber equipment at the modem pool, 2) performing demodulation at the modem pool modems, 3) performing LCP termination and conversion of the PPP packets in the AAL processing function, 4) encapsulating the PPP packets into AAL5 CPCS PDUs and segmenting the PDUs into ATM cells in the AAL processing function, 5) delivering the cells from the MAP to the AFM, and 6) receiving the ATM cells at the AFM and placing them on the ATM pipe for delivery to the ESP system over the second communication link.

The foregoing arrangement provides downlink transmission of PPP packets from the ESP system to the subscriber equipment. In particular, downlink packet transmission includes 1) receiving ATM cells carrying PPP packets over the ATM pipe (representing the second communication link) at the AFM, 2) delivering the ATM cells from the AFM to the MAP, 3) assembling the ATM cells into AAL5 CPCS PDUs and unencapsulating the PPP packets therefrom in the AAL processing function, 4) performing LCP termination and conversion of the PPP packets in the AAL processing function, 5) modulating the converted PPP packets at the modem pool modems, and 6) routing the modulated PPP packets for delivery to the subscriber equipment over the first communication link.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 3 is a more detailed functional block diagram showing the system of FIG. 2;

FIG. 4 is a functional block diagram showing ESP communication equipment for use with the present invention;

FIG. 5 is a front elevation view of an Access Interface Unit AIU configured in accordance with the present invention, with a right-side section thereof broken away to illustrate internal TDM and ATM backplanes therein;

FIG. 7 is a high-level functional block diagram showing a MAP and an interconnected AFM in accordance with the invention;

FIGS. 10a, 10b and 11 are flow diagrams showing PPP packet flow in the uplink and downlink directions, respectively, in accordance with the invention;

FIG. 12 is a flow diagram showing a connection teardown procedure performed in accordance with the invention;

FIG. 14 a functional block diagram showing a modem complex in the MAP of FIG. 7; and FIGS. 15a and 15b are functional block diagrams showing data packet flow through the modem pool and broadband access concentrator system of FIG. 2 in the uplink and downlink directions, respectively.

DETAILED DESCRIPTION OF THE PREFERRED EMBODIMENT

Figure 1:
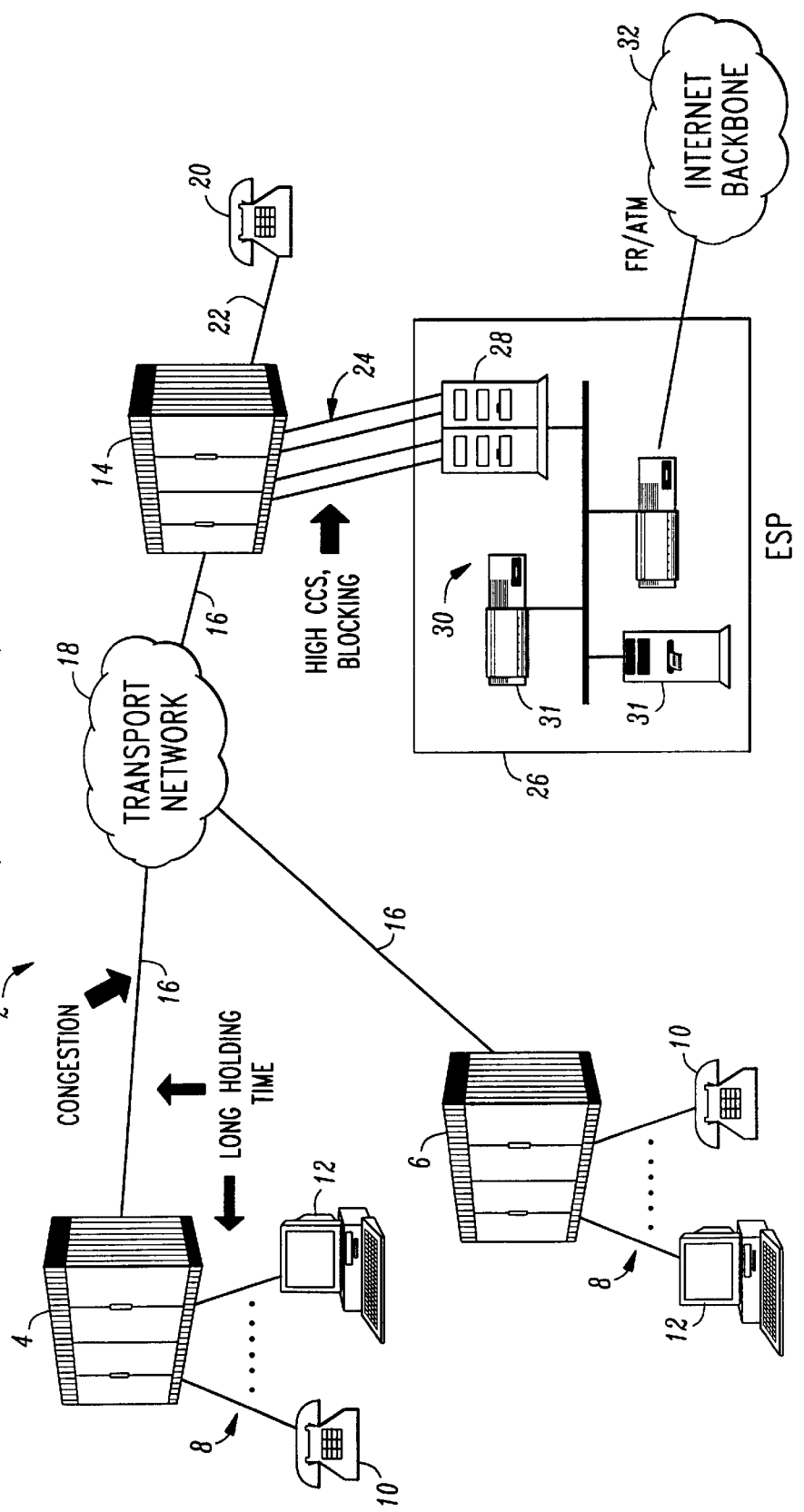
FIG. 1 is a functional diagram showing a prior art system for routing data traffic through the PSTN.

Turning now to the figures, wherein like reference numerals represent like elements in all of the several views, FIG. 1 illustrates a prior art system 2 for providing data network access via the PSTN. In the system 2, switches 4 and 6 are deployed to provide local loop telephone service at a telephone service provider Central Office (CO). Each switch connects via local loop lines 8 to a variety of subscriber equipment, including telephones 10 and data terminals 12, the latter being equipped with an analog or digital communication device, such as an analog modem, an ISDN modem, etc.

A third switch 14 is connected via trunks 16 and a transport network 18 to the switches 4 and 6. The switch 14 may provide ordinary local loop service to telephone subscriber equipment, such as the telephone 20 that is connected to the switch 14 via a local loop line 22. In addition, a digital trunk group 24 connects the switch 14 to an ESP Remote Access Server (RAS) 26. More particularly, the trunk group 24 connects to an ESP digital modem pool 28. The modem pool 28 connects to the ESP's local area network 30, which in turn is connected (e.g., via a Frame Relay (FR) or ATM connection) to the Internet (Backbone) 32. The modems in the modem pool 28 participate in point-to-point connections with the data terminals 12 and also convert between the compressed TDM data packet format used in the PSTN and the uncompressed data packet format used on the Internet 32.

As described in the Background section above, the system 2 has several problems caused by increasing data traffic volumes. Due to the long call hold times of the data terminals 12 when accessing the Internet 32, trunk congestion occurs on the trunks 16 and in the transport network 18 generally. In addition, the digital trunks 24 use excessive switch resources and may cause high CCS blocking that can negatively impact line availability for voice equipment such as the telephone 20. High CCS blocking may also occur at the switches 4 and 6. Finally, the capacity of the trunks 24 is greatly under-utilized insofar as a 64 kbps connection is dedicated to a modem that may only average about 4–8 kbps during a data communication session.

Figure 2:
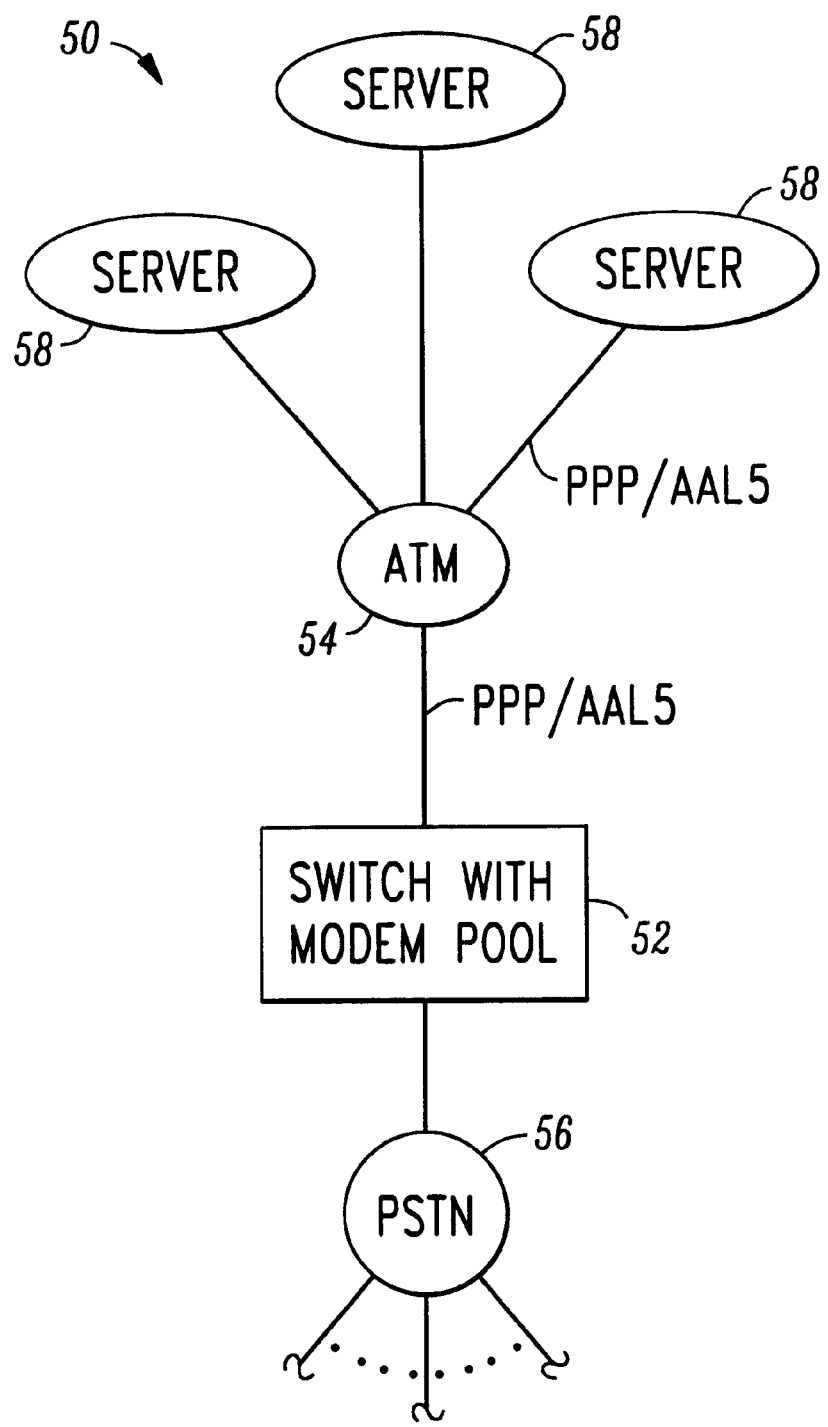
FIG. 2 is a high-level functional block diagram showing a modem pool and broadband access concentrator system constructed in accordance with the present invention for routing data traffic through the PSTN.

Turning now to FIG. 2, an improved system 50 in accordance with the present invention uses the notion of a switch and integrated modem pool/broadband access concentrator 52, and a data network (e.g., ATM) pipe 54, to route PPP data traffic between subscriber equipment (not shown) connected to the PSTN 56 and one or more ESP RAS's 58. Advantageously, the improved topology of FIG. 2 provides multiplex access for subscribers on the data pipe 54 that interfaces to the Servers 58 without requiring the switch/modem pool 52 to terminate the PPP access link.

The subscriber can thus continue to receive their current service, but congestion can be reduced and the cost of the terminating modem and the call connection to the servers 58 can be decreased. This is accomplished by eliminating the outgoing channel interface per user that is present in the switch 14 and the RAS 26 of FIG. 1, and instead concentrating the data traffic over the data pipe 54. At the same time, the PPP link between the subscriber and ESP equipment is maintained using the tunneling protocol known as L2TP. The subscriber equipment may include either dial-up analog modems or digital modems.

Turning now to FIG. 3, the system 50 of FIG. 2 is illustrated in more detail. As shown therein, a subscriber 60 operates a data terminal 62 that is assumed to have an analog modem (not shown) connected via a local loop line 64 to a POTS (Plain Old Telephone Service (POTS) line card 66 situated at a switch 68 that is configured to function as the switch and integrated modem pool/broadband access concentrator 52 of FIG. 2. In an exemplary embodiment of the invention, the switch 68 can be implemented using one or more SM-2000™ switching units 70 and 72 from Lucent Technologies Inc. (Lucent). The SM-2000™ switching unit product implements Lucent's Access Interface Platform (AIP) wherein interface components, such as line cards, are carried as modularlized circuit packs that mount into an Access Interface Unit (AIU).

In FIG. 3, the switching unit 70 includes an AIU 74 that carries a plurality of the POTS line cards 66. The other switching unit 72 may also include an AIU 76 that carries a plurality of Modem Application Packs (MAPs) 78 and an ATM Feeder Multiplexer (AFM) 80 for implementing the modem pool and broadband access concentrator of the invention. FIG. 3 represents an embodiment of the invention wherein the switching units 70 and 72 are co-located at a single switch, i.e., the switch 68. As such, they may communicate through a Lucent Communication Module (CM) 82 that is controlled by a Lucent Administration Module (AM) 84.

It will be further seen in FIG. 3, that the AFM 80 connects to an ATM network 82 that in turn connects to an ESP premises 84. Thus, in FIG. 3, the data pipe 54 of FIG. 2 is implemented as an ATM pipe extending across the ATM network 82. The MAPs 78 and the AFM 80 provide a local broadband access concentrator for efficiently combining the data traffic arriving at the MAPs 78 onto the ATM pipe 54. As described in more detail below, each MAP includes an AAL processing function that implements the tunneling protocol known as L2TP ("Layer 2 Tunneling Protocol"). This protocol allows a dial-up server, as represented by the MAP 78 and the AFM 80, to act as an L2TP Access Concentrator (LAC) that provides access to a remote ESP, which acts as an L2TP Network Server (LNS) by extending the PPP connection through a tunnel in the ATM network 82 to which the LAC and the LNS are directly connected. A "tunnel" as used herein, means a network layer connection between two nodes, used in the role of a data link layer connection between those nodes. The L2TP is described in RFC2661 of the Internet Engineering Task Force (IETF) entitled "Layer 2 Tunnel Protocol 'L2TP'." Use of the L2TP over AAL5 is described in a draft of the PPP Extension Working Group of the IETF entitled "L2TP over AAL5 and FUNI." These documents have been published on the World-Wide-Web at www.ietf.org. In accordance with the L2TP, and as described in more detail below, the AAL processing function encapsulates PPP packets traveling in the uplink direction from the subscriber equipment 62 to the ESP equipment 83 in the payload field of the AAL5 CPCS PDUs. An inverse unencapsulation operation is performed on PPP packets traveling in the downlink direction from the ESP equipment 83 to the subscriber equipment 62. The AAL processing function also performs the usual SAR (Segmentation And Reassembly) functions to process the AAL5 CPCS PDUs into/out of the standard 53 byte ATM cell format. As also described in more detail below, the AAL processing function performs LCP option negotiation on the first and second communication links. The AAL processing function also performs link layer conversions on PPP packets passing therethrough to the extent such conversions are necessary to satisfy the negotiated options on each link.

FIG. 4 provides an illustration of exemplary equipment that could be used at the ESP premises 84 in accordance with the invention. As shown therein, the ATM pipe 54 extending through the ATM network 82 is a trunk 86 (e.g., DS3) connecting to an ATM RAS 88. In an exemplary implementation, the ATM RAS 88 could be a PortMaster 4™ device from Livingston Enterprises, Inc. Internally, the ATM RAS 88 terminates the ATM pipe 54 at a plurality of PPP termination points.

The Internet side of the ATM RAS 88 provides an Ethernet connection to the ESP's local area network 90. Other hosts on the network 90 include a DNS (Domain Name Server) 92 and a control terminal 94 that is used by an ESP administrator 96 to control ESP operations. A gateway router 98 connects the ESP to the Internet 100 via an appropriate connection, such as an FR or ATM link 102.

Turning now to FIG. 5, the component arrangement of an exemplary implementation of the AIU 76 is shown. In particular, FIG. 5 illustrates a single shelf of an AIU 76 that could have several such shelves. Moreover, although not shown, multiple AMUs 76 can be ganged together as needed to accommodate traffic loads. As can be seen, the AIU 76 includes plural MAPs 78 and at least one AFM 80. The MAPs 78 and the AFM 80 plug into a pair of backplanes 114 and 116 via the usual backplane receptacle slots (not shown).

Figure 6:
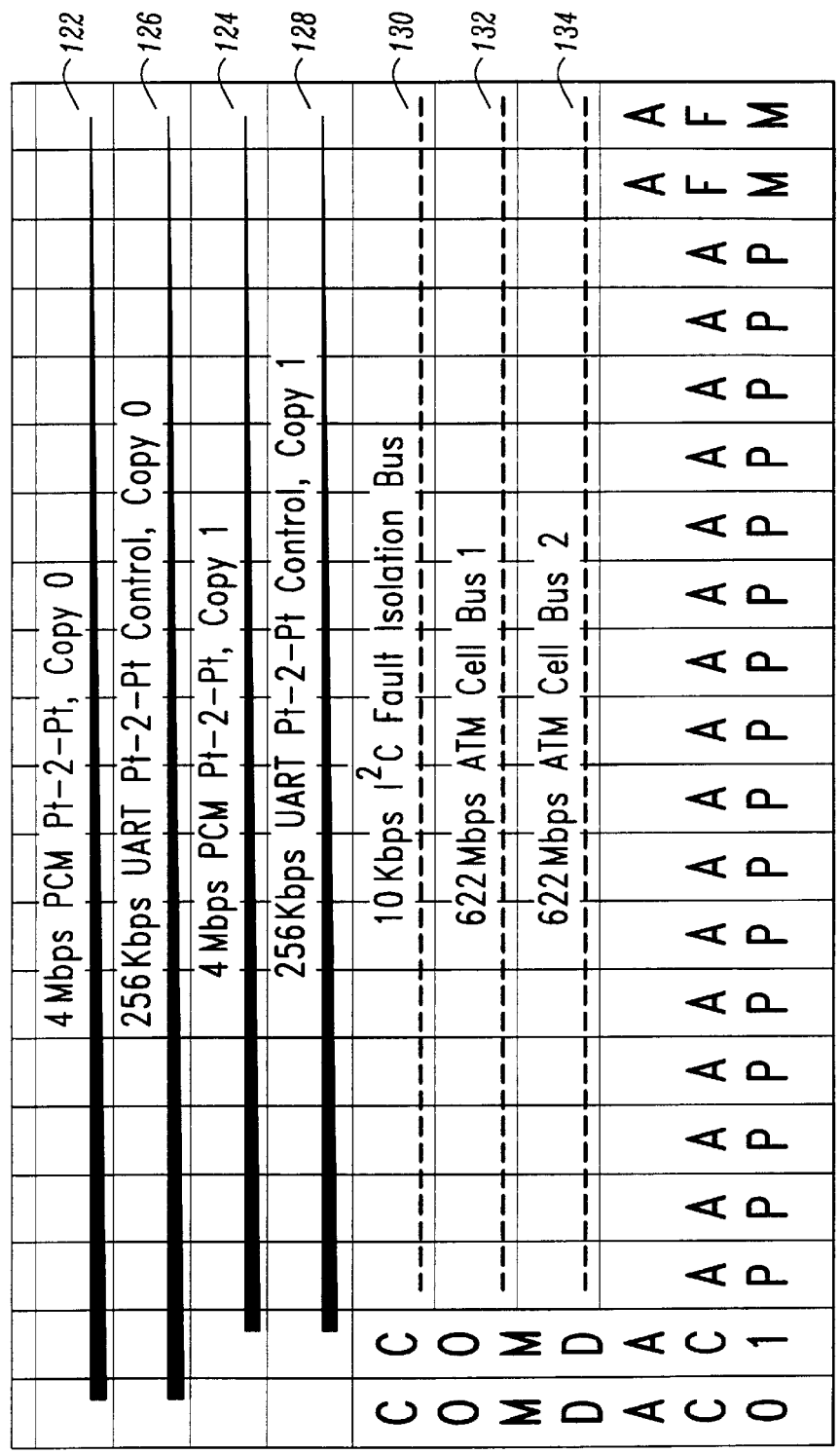
FIG. 6 is a functional view of the data and control bus architecture of the AIU of FIG. 5.

As additionally shown in FIG. 6, the backplanes 114 and 116 carry multiple information busses. The backplane 114 serves as a TDM (Time Division Multiplex) Bus carrying two sides 122 and 124 of a TDM highway 122/124. The backplane 114 also carries two sides 126 and 128 of a UART (Universal Asynchronous Receiver Transmitter) serial control bus 126/128. The backplane 116 carries a fault isolation highway 130 and two sides 132 and 134 of an ATM cell bus 132/134.

As described in more detail below, it is the job of each MAP 78 and the AFM 80 to route data traffic entering the AIU 76 on the TDM highway 122/124, from subscribers, to the ATM bus 132/134, for delivery to ESPs, and visa versa. The data entering the TDM highway 122/124, as well as serial control data carried on the UART control bus 126/128, is carried to the MAPs 78 from a pair of COmmon DAta and Control packs (COMDACs) 120. A first one of these COMDACs, labeled as COMDAC0, connects to the side 122 of the TDM highway 122/124 and the side 126 of the UART control bus 126/128. A second one of the COMDACs, labeled as COMDAC1, connects to the side 124 of the TDM highway 122/124 and the side 128 of the UART control bus 126/128. It is the function of the COMDACs to provide an interface between the MAPs 78 and a higher level controlling entity (not shown) in the switching unit 72

Turning now to FIG. 7, additional components of the MAP 78 and the AFM 80 are shown. In the MAP 78, a timeslot fanout unit 140 is connected on one side to the TDM highway 122/124. The other side of the fanout unit 140 is connected to plural modem chips 142. The modem chips 142 perform PPP packet modulation/demodulation (described in more detail below) and also communicate with the AAL processing function 144 and a MAP Random Access Memory (MAP RAM) 146. A MAP cell bus switch 148 provides an interface to the cell bus 132/134. Modem operations are controlled by a Modem controller function 149.

The AFM 80 includes its own AFM cell bus switch 150, an AFM cell bus controller 152, and an ATM routing chipset 154. There is also an ATM framer 156 and a DS3 line interface unit 158.

Figure 8A:
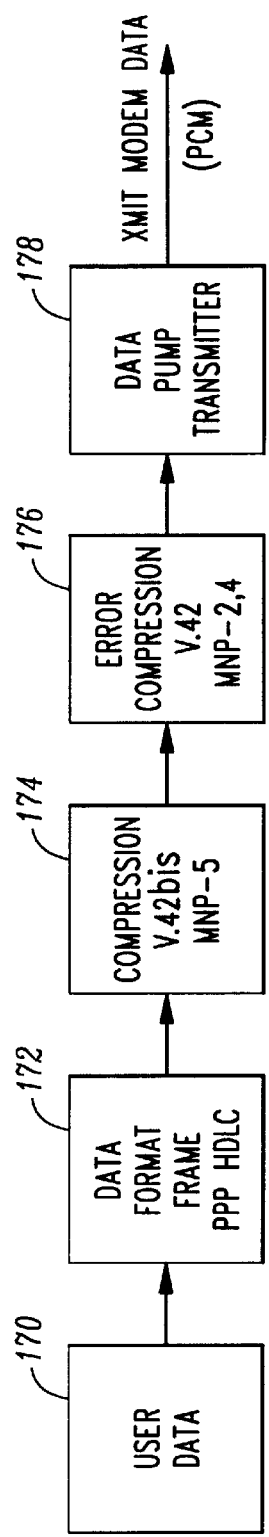
FIGS. 8a and 8b are flow diagrams showing operations performed by a modem in the MAP of FIG. 7 in the downlink and uplink directions, respectively.
Figure 8B:
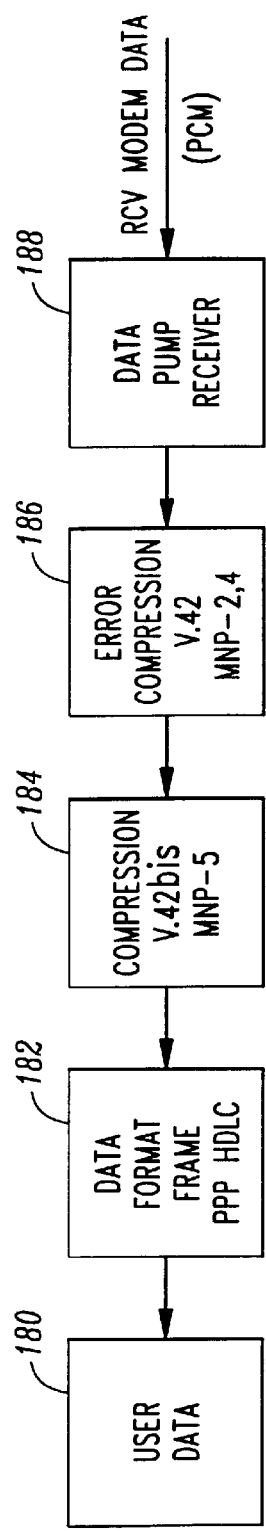

Turning now to FIGS. 8a and 8b, the modulation/demodulation operations of the modem chips 142 are illustrated via a functional flow model describing the functional progression from network packet to TDM packet and from TDM packet to network packet. FIG. 8a shows the transmit signal path (from ESP to subscriber) and FIG. 8b shows the receive signal path (from subscriber to ESP). In the transmit signal direction of FIG. 8a, user data is received at block 170. This data could represent a Web page, a document, or any other data that would be "downloaded" from a server to a client. At block 172, the data is formatted for the link to the subscriber using the PPP protocol suite and HDLC (High level Data Link) formatting. Compression using the Alaw or μlaw algorithms is performed at block 174 and error correction coding is performed at block 176. Block 178 is the data pump transmitter that places the data in a TDM channel. Blocks 180–188 in FIG. 8b perform the inverse of the operations performed by blocks 170–178 of FIG. 8a and will not be individually described.

Figure 9:
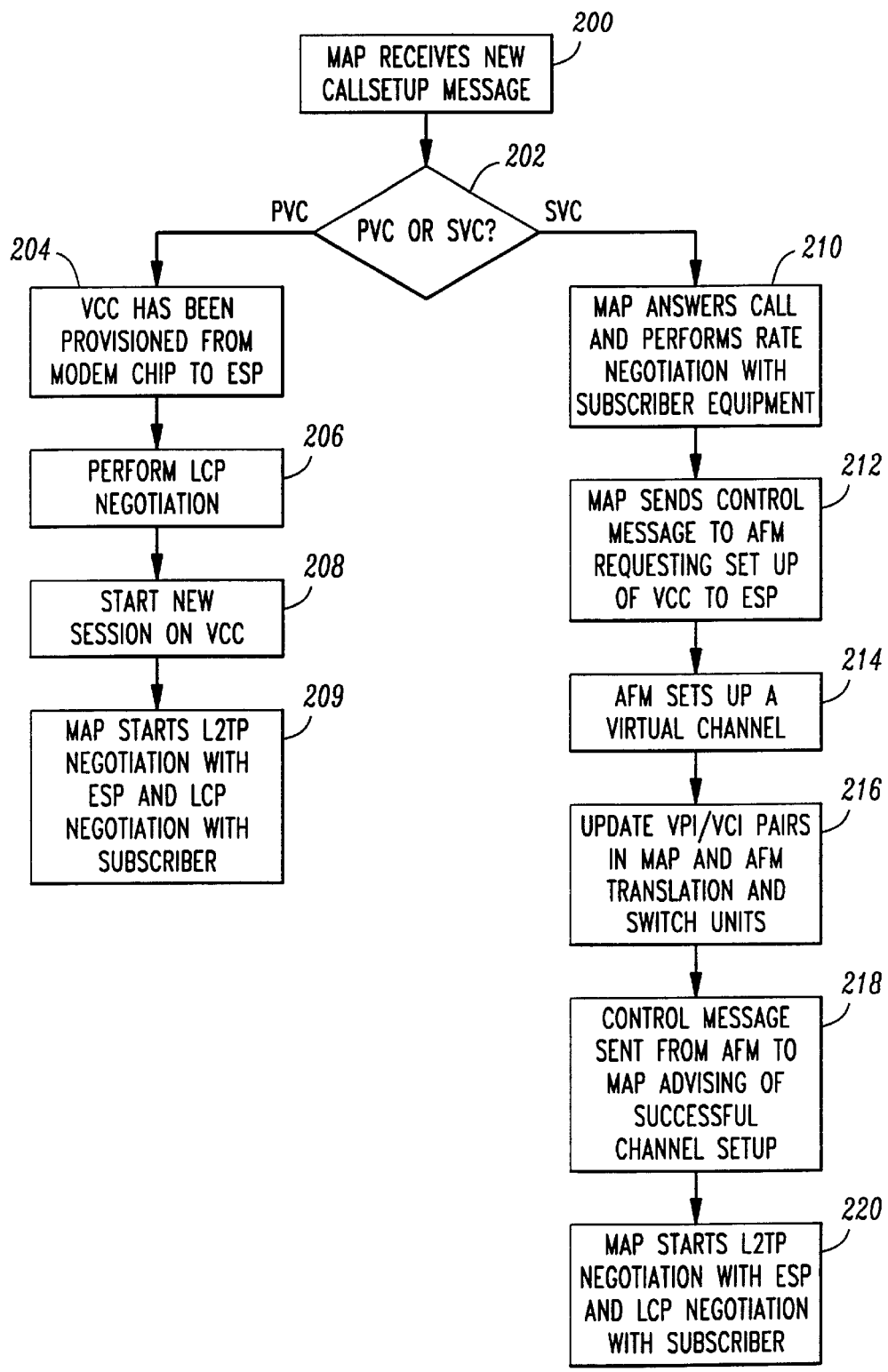
FIG. 9 is flow diagram showing a broadband connection setup procedure performed in accordance with the invention.

Turning now to FIG. 9, the operation of the AIU 76 to setup a voice band modem call through the ATM network 82 to an ESP will be described. In a first step 200, the MAP 78 receives a message that it needs to setup a new modem call. This message is sent from a higher level controlling entity (not shown) in the switching unit 72. The message identifies the dialed number that will be used in the call. Thereafter, a virtual circuit is set up and L2TP negotiation is performed between the LAC that is represented by the MAP 78 and the AFM 80 and the LNS that is represented by the ESP's RAS.

In step 202, the type of connection between the MAP 78 and the ESP that will terminate the PPP link with the subscriber is determined. In the present embodiment, the invention is implemented with an ATM pipe to the ESP. Thus, the connection will be either a Permanent Virtual Circuit (PVC), or more preferably, a Switched Virtual Circuit (SVC).

If, in step 202, the connection is determined to be a PVC, then a physical Virtual Channel Connection (VCC) is already provisioned in step 204 from one of the modem chips 142 in the MAP 78 to the ESP. The AAL processing function 144 then performs Link Control Protocol (LCP) negotiation in step 206 and this starts a new session on the VCC in step 208. In step 209, the AAL processing function 144 starts L2TP session negotiation with the ESP's RAS, and LCP negotiation with the subscriber equipment.

If, in step 202, the connection is determined to be an SVC, one of the modem chips 142 in the MAP 78 answers the call from/towards the switch 68 and performs rate negotiation with the subscriber equipment in step 210. In step 212, the AAL processing function 144 sends a control message to the AFM 80 requesting that it set up a VCC to the ESP. This message contains an internal Virtual Path Identifier (VPI) and Virtual Channel Identifier (VCI) of a modem chip 142 in the MAP 78, along with the rate that was negotiated with the subscriber. If the ESP's ATM address is provisioned/stored in the MAP 78, the AAL processing function 144 also includes this address in the message. If the ESP's ATM address is not provisioned/stored in the MAP 78, the AAL processing function 144 includes the digits that were dialed by the subscriber equipment in the message.

In step 214, the AFM 80 attempts to setup the virtual channel to the ESP. In the case where the ESP's ATM address was provided by the MAP 78, the AFM 80 negotiates the setup of the SVC between itself and the ESP. The actual SVC setup could be a many step process depending on the number of ATM switches that are between the AFM 80 and the ESP. In the case where the dialed digits are provided, the AFM 80 uses the dialed digits to query a network database (not shown) located at a centralized location to obtain the ATM address of the ESP. This query can be a standard UDP message carried over a virtual channel to the database. After receiving the ESP's ATM address from the database, the AFM 80 negotiates the setup of the SVC between itself and the ESP. Again, the actual SVC setup could be a many step process depending on the number of ATM switches that are between the AFM 80 and the ESP. After the SVC is successfully setup, the AFM 80 updates the ATM routing chipset 156 and the ATM cell bus switches 148 and 150 in step 216 with an internal VPI/VCI pair corresponding to the modem chip 142 involved in the connection, and an external VPI/VCI pair corresponding to the ESP. Further details of this dual VPI/VCI connection procedure are described below.

In step 218, a control message is sent from the AFM 80 to the AAL processing function 144 advising that the virtual channel was setup successfully. In step 220, the AAL processing function 144 starts L2TP session negotiation with the ESP's RAS, and LCP negotiation with the subscriber equipment. At this point the modem connection is setup and billing of the call begins.

Figure 10A:
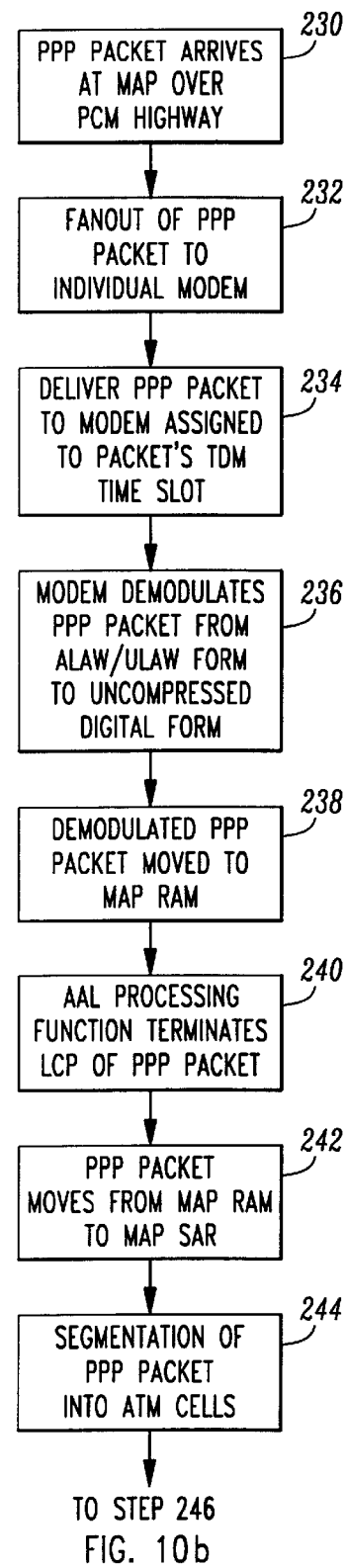
Figure 10B:
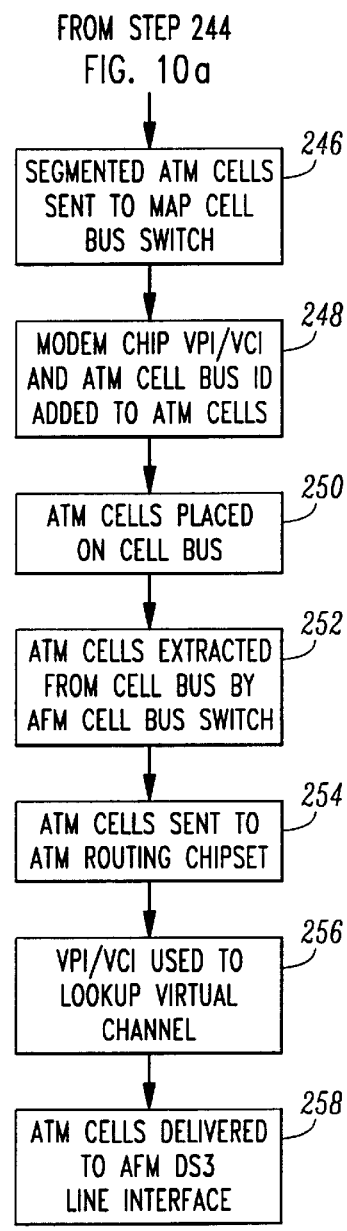

Turning now to FIGS. 10a and 10b, the flow of voice band PPP packets through the AIU 76 is illustrated. FIG. 10a illustrates uplink flow from the subscriber to the ESP and FIG. 10b illustrates downlink flow from the ESP to the subscriber.

In step 230 in FIG. 10a, a PPP packet arrives at the MAP 78 over the TDM Highway 122/124, embedded in the voice band as tones. In step 232, the timeslot fanout unit 140 in the MAP 78 fans out the PCM highway 122/124 to the individual modem chips 142. This is preferably a fixed relationship of one TDM time slot to one modem chip that is established when the MAP 78 is initialized. In step 234, the PPP packet travels through the timeslot fanout unit 140 and arrives at the modem chip 142 to which the TDM highway timeslot was assigned. In step 236, the modem demodulates the PPP packet from its Alaw/μlaw encoded form to uncompressed digital form. In step 238, the output of the modem chip 142, the PPP packet in uncompressed digital form, is moved into the MAP RAM 146. In step 240, the AAL processing function 144 terminates the LCP of the PPP packet. Details of the LCP termination procedure are described below. In step 242, the PPP packet moves from the MAP RAM 146 into the AAL processing function 144. In step 244, the AAL processing function 144 encapsulates the PPP packet into an AAL5 CPCS PDU. It then segments the PDU into 48 byte ATM payload units and adds the usual header and routing fields to form 53 byte ATM cells. In step 246, the ATM cells enter the MAP cell bus switch 148. In step 248, the cell bus switch 148 adds the modem chip's VPI/VCI into the cell VPI/VCI header fields and writes the ID of the AFM cell bus switch 150 into the cell routing fields. The ATM cells are then placed on the cell bus 132/134 in step 250.

In step 252, the AFM cell bus switch 150 recognizes its address in the routing fields of the ATM cells and extracts those cells from the cell bus 132/134. In step 254, the ATM cells are transferred to the ATM routing chipset 154. In step 256, the ATM routing chipset 154 uses the internal VPI/VCI in the ATM cells to look up the external VPI/VCI for the virtual channel to the ESP. This VPI/VCI translation operation is described in more detail below with reference to FIGS. 15a and 15b. In step 258, the cells are sent out through the ATM framer circuit 156 to the DS3 line interface circuit 158 with the external VPI/VCI of the virtual channel to the ESP.

In step 260 of FIG. 11, which illustrates downlink data flow, the ATM cells are received at the DS3 line interface circuit 158. In step 262, the ATM routing chipset 154 checks the external VPI/VCI to determine that the ATM cells are addressed to the AFM 80. If they are, the ATM routing chipset 154 routes the ATM cells in step 264 to the AFM cell bus switch 150 (with the external VPI/VCI intact). If the ATM cells are not addressed to the AFM 80, they are discarded in step 266. In step 268, the AFM cell bus switch 150 reads the external VPI/VCI, finds the internal VPI/VCI of the correct modem chip 142 in the MAP 78, and modifies cell headers to carry the internal VPI/VCI. This VPI/VCI translation operation is described in more detail below with reference to FIGS. 15a and 15b. In step 270, the ATM cells are placed on the cell bus 132/134, where the VPI/VCI is recognized by the MAP cell bus switch 148 and the cells are extracted. The remaining processing steps are the inverse of steps 230–248 of FIG. 12a and will not be individually described.

Turning now to FIG. 12, the tear down of a voice band modem call, including the SVC connection through the ATM network 82, is illustrated. There are two ways in which the MAP 78 can detect that the modem call should be torn down. One is a loss of carrier. This could occur because the subscriber went "on hook" (hung up) or the SVC connection is no longer up. The second is where the subscriber sends a disconnect signal. When either of these conditions are recognized, the modem chip 142 serving the connection informs the AAL processing function 144 of the event in step 280. In step 282, the AAL processing function 144 sends a message to the AFM 80 to tear down the SVC for this call. In step 284, the AAL processing function 144 sends a UART message to the call processing engine (not shown) in the switching unit 72, stating that the line went on hook.

Figure 13:
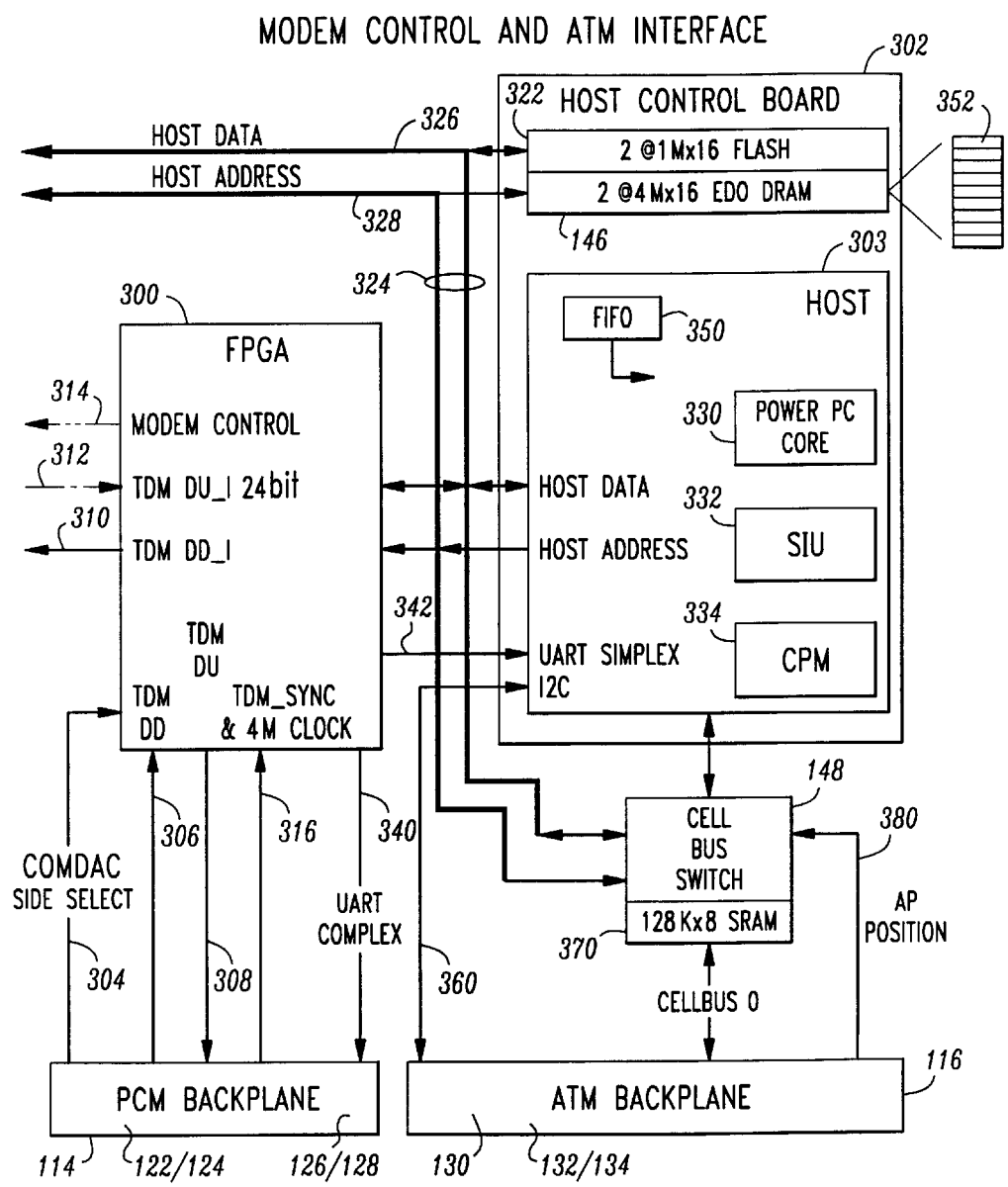
FIG. 13 is a more detailed functional block diagram showing modem controller function and AAL processing function components in the MAP of FIG. 7.

Turning now to FIGS. 13 and 14, the components of the MAP 78 are shown in more detail. These include a Field Programmable Gate Array (FPGA) 300 and a Host Control Board 302 in FIG. 13, and a plurality of the modem chips 142 in FIG. 14. Collectively, the FPGA 300 and the Host Control Board 302 (via its Host micro-controller suite (Host) 303) implement the AAL processing function 144 and the modem controller function 149.

One of the tasks of the FPGA 300 is to select which COMDAC 120 to use for TDM data stream and control message exchange with the switching unit 72. As previously described, the MAP 78 is required to interface with both the TDM highway 122/124 and the ATM cell bus 132/134. From a selected one of the COMDACs 120, the MAP 78 receives a TDM data stream via the TDM highway 122/124. The MAP 78 also receives basic control messages, including timeslot assignment, via the UART serial control bus 126/128. COMDAC selection is controlled by the FPGA 300 by XORing side selection leads 304 of the TDM backplane 114.

The FPGA 300 also routes TDM data between the modem chips 142 and the selected COMDAC 120. The FPGA 300 receives a TDM data "down" stream from the selected COMDAC 120 on the line TDM DD 306 in FIG. 13, and sends a TDM data "up" stream to the selected COMDAC 120 on the line TDM DU 308. The FPGA 300 sends the TDM data down stream to the modem chips 142 on the line TDM DD_I 310 and receives the TDM data up stream on the line TDM DU_I 312. However, before the first bit of a TDM data stream is sent to or received by the modem chips 142, the FPGA 300 feeds a load strobe of one clock pulse to the modem chips on the modem control line 314 (see FIG. 14). The modem chips 142 and the FPGA 300 then pump TDM data in both directions simultaneously on the TDM DU_I and TDM DD_I lines 310 and 312, and on the TDM DU and TDM DD lines 306 and 308. In order to provide an offset between the first DU bit and first DD bit relative to TDM sync timing provided on a TDM_SYNC and 4M clock line 316, the TDM data up stream is buffered in the FPGA registers (not shown). As stated, the FPGA 300 supplies the modem chips 142 with an appropriately timed TDM load strobe on the modem control line 314. This clock is separate from the device clock and is supplied relative to the 4M clock provided on the line 316.

The system memory of the Host Control board 302 consists of a suitably sized (e.g., 4 Mbytes) FLASH RAM 322 and a suitably sized (e.g., 16 Mbytes) DRAM, representing the MAP RAM 146. This memory is connected to a Host Bus 324 comprising a Host Data bus 326 and a Host Address bus 328. The FLASH RAM 322 is used to hold the code image for each programmable device on the MAP 78, including the modem chips 142, the FPGA 300, and the Host control board 302.

In an exemplary construction, the Host 303 is implemented with three major modules: a PowerPC (PPC) core 330, a System Integration Unit (SU)) 332, and a Communications Processor Module (CPM) 334. The PPC core 330 is the main controller for the Host Control Board 302. The SIU 332 provides a memory controller, a bus interface, and a real time clock for the Host Control Board 302. The CPM 334 provides a RISC processor, four serial communication controllers, two serial management channels, an I²C port and an interface to the MAP cell bus switch 148. As will now be described, the components in the Host 303 perform several specific tasks.

Each modem chip 142 is controlled by Digital Signal Processing (DSP) code for implementing modem functionality through K56flex and V.90. The DSP code may be stored as an image in a suitably sized (e.g., 128 Kbytes) SRAM storage location 320 on each modem chip 142. The FLASH RAM 322 on the Host Control Board 302 can be used to hold the DSP image, which can be downloaded to the modem chips 142 after each hard reset. The pathway that is used for this purpose between the FLASH RAM 322 and the modem chips 142 is the Host Bus 324, which is managed by the SIU 332.

Using the services of the CPM 334, the PPC core 330 controls communications through the MAP 78. UART messages are transferred between the UART serial control bus 126/128 and the FPGA 300 over UART Complex lines 340. The UART messages are then transferred between the FPGA 300 and the CPM's serial communication ports over the UART Simplex lines 342. The PPC core 330 decodes the UART messages and sets registers in the FPGA 300 that implement TDM fanout, time slot assignment and other control signals to the modem chips 142.

In an exemplary implementation, the PPC core 330 is able to access 16 registers inside each modem chip 142. These registers are memory mapped to the MAP RAM 146. Each modem chip 142 has an address assigned by strapping five external pins (not shown) connected to the Host Address bus 328 to a unique combination of power and ground. Along with modem chip addressing, an enable signal from the memory controller in the SIU 332 can be used to avoid MAP memory and modem chip contention.

Modem data and control signals are transferred between the modem chips 142 and the PPC core 330 along the Host Data bus 326, which by way of example, can be a sixteen bit wide bus. Each modem chip DSP can access its own SRAM 320 through a memory controller (not shown) and a private memory interface (not shown) associated with each such device.

Data transfer to and from the PPC core 330 is through a single register 350 that is used as an accessible end of a First In First Out (FIFO) data structure 352 in the MAP RAM 146. For data transfer from a modem chip 142 to the PPC core 330, an Interrupt Request (IRQ) is generated by the modem chip and collected in the FPGA 300 to inform the PPC core 330 that data is ready for transfer. As it is sent, the data is buffered into the FIFO data structure 352 for subsequent segmentation processing by the SIU's memory controller. For data transfer to a modem chip 142, the PPC core 330 fills the FIFO data structure 352 with PPP packets. As it does, it generates an internal interrupt to the SIU's memory controller to transfer the data to the modem chip's DSP. The FPGA 300 is responsible for producing data and timing signals for the modem chip 142 during this processing. The FPGA 300 is also connected to one of the PPC core's external IRQ pins and generates a request if any of the modem chips 142 has a pending IRQ. When the PPC core 330 receives this interrupt request from the FPGA 300, it reads a register in the FPGA that represents collected, maskable interrupt requests from the modem chips 142.

Control messages are exchanged over the ATM cell bus 132/134 through the MAP cell bus switch 148. The PPC core 330 uses these control messages to set the active cell bus channel and the external VPI/VCI addresses of the ESPs, if such addresses are provisioned in the MAP 78.

The fault isolation highway 130 of the ATM backplane 130 is connected via line 360 to the I²C interface of the CPM 334. The messages received at the I²C interface are transferred to the PPC core 330 for decoding and implementation.

When data is received from the modem chips, it is inspected for control structure by the PPC core 330 and then handed off to the CPM 334 for LCP translation, encapsulation into AAL5 CPCS PDU's, and segmentation into ATM cells. After the creation of ATM cells, the modem data is transferred to the MAP cell bus switch 148 via the CPM's UTOPIA (Universal Test & Operational Interface for ATM) interface (not shown). The MAP cell bus switch 148 includes a small translation SRAM (e.g., 128 Kbytes) 370 for writing the modem chip's VPI/VCI and the AFM's cell bus ID into the cell header fields. The translation SRAM 370 can be written to or read from by the PPC core 330 through memory map registers (not shown). Therefore, the VPI/VCI addressing can be edited while the MAP 78 is in service.

The ATM backplane 116 also contains pins that can be read to determine the MAP's slot position in an AIU shelf via an AP position line 380. This information can be used to set the MAP cell bus switch's cell bus address.

Turning now to FIGS. 15a and 15b, a further description of PPP packet flow will now be set forth. As is known, the PPP protocol provides a method for transmitting datagrams over serial point-to-point links. It consists of a suite of protocols, each of which is designed to provide a specific set of functionalities. Briefly, the LCP is used by two peers to establish, configure, and test the data link connection; the NCP is used to establish and configure different network layer protocols (such as IP); and the PAP/CHAP is used to perform user authentication.

A common way that the PPP protocols are employed is to have two peers terminate both the LCP and the higher layer PPP control protocols. This is the case when there is only one media type and one data link between the peers. The AIU 76 deviates from this model. Facing the subscriber side, the MAP 78 may communicate with a subscriber modem that operates in the asynchronous mode. Facing the network (ESP) side, the MAP 78 communicates with ESP equipment using AAL5 over ATM, which is synchronous. This means that between a subscriber modem and ESP equipment, there are two data links, each having its own media type and link layer. The MAP 78, and particularly the AAL processing function 144 therein, effectively concatenates these two segments to form an end-to-end link. As described above, the MAP 78 and the AFM 80 collectively represent a dial-up server that acts as a L2TP Access Concentrator for receiving PPP packets over a first data link from the subscriber modem, and tunneling them over a second data link in an L2TP tunnel to the ESP RAS, representing an L2TP Network Server.

The LCP defines a set of data link configuration options for each media and link type. Different media types may have an incompatible set of configuration options. To make the end-to-end PPP link work, it is necessary for the MAP 78 to act as an LCP termination point for each of the data link segments and for the AAL processing function 144 to perform necessary data link layer conversions on packets passing between the links. The conversions are performed for uplink traffic just prior to PDU encapsulation and for downlink traffic just following PDU unencapsulation. They are needed because of the different LCP configuration options that exist on each link, described in more detail below, which require that changes be made the content of the PPP frame fields. For each active session, the AAL processing function 144 also provides two LCP state machines (conventionally referred to as LCP option negotiation automatons) to implement the LCP option negotiation procedure on each link.

Except for terminating the LCP links, the MAP 78 is not involved in the processing of the network or higher layer PPP control protocols. In other words, PPP packets associated with these control protocols pass through the MAP 78 transparently. Advantageously, functions such as dynamic IP address negotiation/assignment and user authentication can be provided by the ESP equipment as usual.

Some commonly used PPP data link configuration options for the asynchronous TDM link and synchronous ATM link are listed in Table 1 below. A row that is not checked under both the "Asynchronous TDM Link" and "ATM Link" columns means that a conversion on a PPP frame must take place. For all the configuration options listed in the table below, the subscriber modem side is master and its values will be used. The MAP 78 will pass other options transparently between the subscriber user modem and ESP equipment:

| Type Code | Configuration Option | Asynchronous TDM Link | ATM Link |
|---|---|---|---|
| 1 | Maximum-Receive-Unit | x (note) | x (note) |
| 2 | Async-Control-Character-Map | x | |
| 3 | Authentication-Protocol | x | x |
| 4 | Quality-Protocol | x | x |
| 5 | Magic-Number | x | x |
| 7 | Protocol-Field-Compression | x | x |
| 8 | Address-and-Control-Field-Compress. | x | |
| 9 | FCS-Alternatives | x | |

Note:
The MAP 78 needs to ensure that the smaller of the two MRUs is used end to end.

In the uplink direction from the subscriber equipment to the ESP equipment, it will be seen from the foregoing table that the MAP 78 must perform stuffing conversions to convert PPP frames that are formatted according to the Async-Control-Character-Map, Address-and-Control-Field-Compression and FCS-Alternatives options used on the asynchronous link to PPP frames that do not have these options set on the synchronous link to the ESP equipment. For example, control characters that are mapped on the asynchronous should be unmapped on the synchronous link. Similarly, data link layer address and control fields that are compressed on the asynchronous link must be uncompressed. Finally, frame check sequence patterns used on the asynchronous link must be removed from the PPP frames sent over the synchronous link.

FIGS. 15a and 15b depict the internal cell flow between the MAP modem chips 142 and the ATM framer 156 and DS3 line interface 158 (not shown). FIG. 15a shows the flow from the modem chips to the DS3 line interface and FIG. 15b shows the flow from the DS3 line interface to the modem chips. In order to understand how the internal cell flow works, it will be helpful to describe in more detail the functions and capabilities of the components of the AFM 80. Closest to the cell bus 132/134 is the AFM cell bus switch 150. Like its counterpart, the MAP cell bus switch 148, the AFM cell bus switch 150 only supports unidirectional VPI or VPI/VCI translation in the direction of the cell bus 132/134. It also performs device addressing, multi-cast, and broadcast over the cell bus 132/134. In the opposite direction (away from the cell bus 132/134), the AFM cell bus switch 150 does not perform VPI/VCI translation (nor does the MAP cell bus switch 148). This is done by the ATM routing chipset 154, which supports VPI/VCI translation, policing, and per-connection statistics counters. The ATM routing chipset 154 also supports cell buffer and queue priority management, and congestion management. The DS3 framer 156 terminates the DS3 physical layer and performs ATM cell delineation.

One architectural consideration that leads to the cell routing scheme depicted in FIGS. 15a and 15b is to have the per-call connection set-up functions performed in one place; namely, the AFM 80. This has two aspects with respect to per-call handling. First, the AFM 80 preferably runs the UNI 4.0 SVC signaling protocol (see www.atmforum.com) toward the ESP RAS. For a given modem call, the AFM 80 and the ESP RAS will use conventional UNI SVC connection set-up procedures to negotiate and establish a mutual connection. An external VPI/VCI value on the DS3 line interface 158 will be assigned to this connection. This VPI/VCI assignment is bi-directional. Second, once the external VPI/VCI is known, the AFM 80 will perform ATM device operations locally to set up an internal channel (using internal VPI/VCI values) that connects one of the modem chips 142 to the external VPI/VCI DS3 termination point (which differs for the uplink and downlink directions), thus establishing a connection all the way from the modem chip to the ESP RAS. Thus, the MAP 78 does not need to perform ATM device operations on a per call basis. It only needs to be concerned with the internal connections from the modem chips 142 to the AFM 80 defined by the internal VPI/VCIs.

The internal channels are preferably established at system initialization time using internal VPI/VCI assignments/translations and cell bus switch device addressing. These internal channels could also be established through provisioning; however, this would require more administration overhead in exchange for a slight increase in flexibility. In any case, a modem chip 142 cannot be selected to handle a call unless its internal channel to the AFM 80 has been established, as will now be described.

Relative to the internal channel, each modem chip 142 of each MAP 78 that is connected to a slot in the AIU 76 is assigned an internal AAL5 channel with a unique internal VPI/VCI value. For each slot in a single AIU shelf, the VPI can be set to 1. The starting VCI for each slot can then be set as shown in the table below, which corresponds to an AIU 76 with 19 MAP slots, and with each MAP being allowed 32 modems.

| AIU Slot Position | Starting VCI |
|---|---|
| 1 | 100 |
| 2 | 132 |
| 3 | 164 |
| 4 | 196 |
| 5 | 228 |
| 6 | 260 |
| 7 | 292 |
| 8 | 324 |
| 9 | 356 |
| 10 | 388 |
| 11 | 420 |
| 12 | 452 |
| 13 | 484 |
| 14 | 516 |
| 15 | 548 |
| 16 | 580 |
| 17 | 612 |
| 18 | 644 |
| 19 | 676 |

For purposes of illustration, FIGS. 15a and 15b show that the modem M1 on the MAP 1 is assigned an internal channel with a VPI/VCI value equal to 1/100, and the modem M16 on the MAP 12 is assigned an internal channel with a VPI/VCI value equal to 1/467, etc. The internal VPI/VFI assignment is bi-directional. That is, packets originated from and destined to the same modem chip 142 will use the same internal channel with the same VPI/VCI value assigned in both directions. It will be appreciated that FIGS. 15A and 15b are exemplary only, and that VPI/VCI values could be assigned in many different ways.

Each internal channel, having its own internal VPI/VCI value, originates on one side at a modem chip 142, but terminates at a different location depending on whether the cells are traveling in the uplink direction or the downlink direction. For purposes of illustration, assume that the modem M1 in the MAP1 (with an internal VPI/VCI value of a 1/100) and the modem M1 in the MAP 12 (with an internal VPI/VCI value of 452) have been selected by the switching unit 72 to handle calls to two respective service providers identified as ESP1 and ESP2, respectively. As described above, the ATM UNI 80 is instructed by the MAP 78 to set up SVC connections for these two calls to the RAS's at ESP 1 and ESP2. It will be further assumed that the external VPI/VCI values assigned to these calls are x1/y1 and x2/y2, respectively.

In the direction from the modem chips to the ESPs, the internal channels based on the internal 1/100 and 1/452 VPI/VCI values respectively extend from the MAP1/M1 and MAP 12/M1 modem chips 142, through the MAP1 and MAP12 AAL processing functions 144, to the MAP1 and MAP12 MAP cell bus switches 148. After inserting the internal VPI/VCI and AFM cell bus ID header information, the MAP 1 and MAP 12 MAP cell bus switches 148 route cell traffic across the cell bus 132/134 to the AFM cell bus switch 150. The AFM cell bus switch 150, without changing the internal VPI/VCI values, delivers the cell traffic to the ATM routing chipset 154, where the internal channels are terminated, and the internal VPI,VCI values 1/100 and 1/452 for the MAP1/M1 and MAP12/M1 modems are translated to the external VPI/VCI values x1/y1 and x2/y2, respectively. The external channels now begin. They run from the ATM routing chipset 154 to the DS3 line interface 158, and then to ESP1 and ESP2, respectively.

In the direction from the ESPs to the modem chips, incoming cells from ESP1 and ESP2 are routed on respective external channels identified by the external VPI/VCI values x1/y1 and x2/y2, respectively. The external channels run through the DS3 line interface 158, through the ATM routing chipset 154, to the AFM cell bus switch 150. Here, the external channel terminates and the internal channel begins. The external VPI/VCI values x1/y1 and x2/y2 are respectively translated to the internal VPI/VCI values 1/100 and 1/452, respectively. The AFM cell bus switch 150 routes traffic on the internal 1/100 and 1/452 channels to the MAP1 and MAP 12 cell bus switches 148, respectively. The MAP1 and MAP2 cell bus switches 148 remove the 1/100 and 1/452 cell traffic from the cell bus 132/134 and forward it on the remainder of the internal channels that extends through the MAP1 and MAP12 AAL processing functions 144 to the MAP1/M1 and MAP12/M1 modems, where the internal channels terminate.

As described above, PPP packet handling and AAL5 cell processing are performed solely by the MAP 78; the AFM 80 is not involved. After setting up the internal channels for the modem chips 142 during initialization, the modem controller function 149 is able to move PPP packets between the modem chips 142 and the AAL processing function 144. For each PPP packet to be sent to an ESP RAS, the controller function 149 places it in the MAP RAM 146, and commands the AAL processing function 144 to send it over the assigned internal channel. The AAL processing function retrieves the PPP packet from the MAP RAM 146, performs CRC (Cyclic Redundancy Check) computation over the packet, performs LCP translation, encapsulates the packet in an AAL5 CPCS PDU, and segments the PDU into ATM cells. The MAP cell bus switch 148 then sends the cells to the AFM 80 using the assigned internal channel. In the reverse direction, when a complete PPP packet is received from the AFM 80 over the assigned internal channel and reassembled by the AAL processing function 144 in the MAP RAM 146. When a complete AAL5 CPCS PDU is received, the AAL processing function 144 recomputes CRC and checks it against the received CRC, removes the AAL5 CPCS PDU trailer, performs LCP translation, and informs the modem controller 149 that a packet has arrived. The modem controller 149 then retrieves this packet from the MAP RAM 146. If this is a packet to be sent to an end user modem, the modem controller 149 moves the packet to the SRAM 320 for the specified modem chip 142.

One remaining issue for consideration, in the area of call processing, is the manner in which incoming voice band data call (from a line or trunk) is routed to/connected to a modem chip 142. The typical way to identify dialup voice band data calls is by the dialed digits. Based on this, the switching unit 72 call processing engine can route to the modem chips 142 on the MAP 78 using the dialed digits. The easiest way to implement this may be to use a multi-line hunt group. The hunt type used for the multi-line hunt could be Uniform call Distribution (UCD) such that calls are evenly distributed between the modem chips.

Although dialed digits are a useful method for routing call traffic, there are several other origination possibilities. For example, calls could be delivered via a dedicated data trunk group from a PBX. Today's PBXs have such direct trunk groups to ESP modem pools, and if one of these is replaced with a switch-integrated modem pool as described herein, the calls would arrive at the switch on a dedicated trunk group already groomed as data only. In this case, the trunk group would point via a route index (or possibly a lead phone number) to the multi-line hunt group containing a pool of modem chips assigned to the PBX customer. Another possibility is that calls could be delivered via a data-only "hot line" that again would point to the modem pool hunt group via a route index or lead phone number.

As described above, there are two data link segments between a user modem and an ESP's equipment. The MAP 78 serves as a logical point where a connection between the two data link segments is formed to provide an end-to-end link. The status of the connection point represents the supervision state of the associated modem chip 142. When a connection is made, allowing PPP packets to transparently pass through the connection point, the modem chip 142 is in the OFFHOOK state. When the connection is broken, the modem chip 142 is in the ONHOOK state.

Using the UART serial control bus 126/128, the MAP 78 can generate a supervision message toward the switching unit call processing engine indicating an OFFHOOK/ONHOOK transition when a modem chip 142 enters the OFFHOOK or the ONHOOK state (similar to analog subscriber lines). In particular, a supervision message can be sent when 1) the carrier signal from the subscriber modem is lost, 2) the AAL5 path is torn down (for whatever reason), 3) the modem chip 142 is made unavailable by the modem controller 149, 4) the MAP 78 is reset or initialized, or 5) the switching unit 72 requests a disconnect, such that the connection is broken and the modem port enters the ONHOOK state.

The MAP 78 also supports various requests initiated by the switching unit's call processing engine, including requests to 1) inhibit/allow autonomous report of supervision or service status transitions, 2) query inventory and operation status information of a MAP 78, 3) query supervision status of a connection point (ONHOOK/OFFHOOK), 4) query service status of a modem (available/unavailable), 5) request a connection to a modem chip 142, and 6) request disconnection of a modem call.

Accordingly, a telephone switch-integrated modem pool and broadband access concentrator have been described that provide improved data network access through a PSTN local loop. While various embodiments of the invention have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A telephone switch-integrated modem pool and broadband access concentrator providing PSTN access for dial-up data communication traffic, comprising:

a switch terminating at least one local subscriber loop arranged for connection to a subscriber's data processing and communication equipment (subscriber equipment);

a modem pool associated with said switch, said modem pool including at least one modem adapted to communicate with said subscriber equipment and to modulate/demodulate data packets sent to and received from said subscriber equipment;

a broadband access concentrator for encapsulating/unencapsulating said data packets into/from a delivery format suitable for broadband transmission in a broadband data network, said broadband access concentrator including a broadband interface;

a broadband data network pipe (broadband pipe) for connecting said broadband interface to at least one data network service provider data processing and communication system (service provider system); and processing means associated with said broadband access concentrator for providing LCP (link layer) management and translation between a first communication link extending between said modem pool and said subscriber equipment over said local loop and a second communication link extending between said modem pool and said service provider system over said broadband pipe, said processing means providing said LCP management and translation functions transparently on data traffic passing therethrough so that a point-to-point connection providing PAP/CHAP, NCP and other high level protocol service negotiation can be setup and maintained between said subscriber equipment and said service provider.

2. A system in accordance with claim 1 wherein said broadband pipe is an ATM pipe.

3. A system in accordance with claim 2 wherein said modem pool includes a plurality of modems and a modem controller function, and said broadband access concentrator includes an AAL processing function implementing said processing means and an AFM.

4. A system in accordance with claim 3 wherein said modems, said modem controller function and said AAL processing function are implemented in a MAP, and said first communication link includes a TDM highway between said MAP and said switch.

5. A system in accordance with claim 4 wherein said second communication link includes an ATM cell bus between said MAP and said AFM.

6. A system in accordance with claim 5 wherein data traffic carried on said ATM cell bus between said AFM and said MAP is addressed using an internal addressing scheme that is internal to said system, and wherein said AFM includes an ATM routing unit that translates between said internal addressing scheme and an external addressing scheme shared with said service provider system.

7. A system in accordance with claim 3 wherein said AAL processing function includes means for tunneling data packets sent from said subscriber equipment to said service provider equipment into a layer 2 tunnel extending through said ATM pipe, and for de-tunneling data packets sent from said service provider equipment to said subscriber equipment from said layer 2 tunnel.

8. A system in accordance with claim 1 wherein said AAL processing function includes means for negotiating LCP options between said modem and said subscriber equipment on said first communication link, and between said modem and said service provider system on said second communication link.

9. A system in accordance with claim 1 wherein said broadband access concentrator includes:

means incorporated in said processing means for terminating the LCP protocol of PPP packets carried over said first communication link;

means incorporated in said processing means for encapsulating said PPP packets into AAL5 CPCS PDUs;

means incorporated in said processing means for segmenting said AAL5 CPCS PDUSs into ATM cells;

means for addressing said ATM cells to said service provider equipment; and means for placing said addressed ATM cells on said broadband pipe for delivery to said service provider equipment over said second communication link.

10. A system in accordance with claim 1 wherein said broadband access concentrator includes:

means incorporated in said processing means for terminating the LCP protocol of ATM cells carrying PPP packets over said second communication link;

means for assembling said ATM cells into said AAL5 CPCS PDUs;

means for unencapsulating said PPP packets from said AAL5 CPCS PDUs; and means for routing said PPP packets to modem for delivery to said switch and said subscriber equipment over said first communication link.

11. A telephone switch-integrated modem pool and broadband access concentration method providing PSTN access for dial-up data communication traffic, comprising the steps of:

terminating to a switch at least one local subscriber loop arranged for connection to a subscriber's data processing and communication equipment (subscriber equipment);

establishing communication with said subscriber equipment and performing modulatation/demodulation of data packets sent to and received from said subscriber equpment;

performing broadband access concentration by encapsulating/unencapsulating said data packets into/from a delivery format suitable for broadband transmission in a broadband data network, said broadband access concentration step further including providing said data packets to and receiving said data packets from a broadband interface;

connecting said broadband interface to data network pipe extending to at least one data network service provider data processing and communication system (service provider system); and providing, as part of said broadband access concentration step, LCP (link layer) management and translation between a first communication link extending between said modem pool and said subscriber equipment over said local loop and a second communication link extending between said modem pool and said service provider system over said broadband pipe, said LCP management and translation functions being performed transparently on data traffic processed during said broadband access concentration step so that a point-to-point connection providing PAP/CHAP, NCP and other high level protocol service negotiation can be setup and maintained between said subscriber equipment and said service provider.

12. A method in accordance with claim 11 wherein said broadband pipe is an ATM pipe.

13. A method in accordance with claim 12 wherein said modulation/demodulation step includes controlling a modem pool that comprises a plurality of modems and wherein said broadband access concentration step includes AAL processing and ATM UNI processing, said ATM UNI processing being performed by an AFM.

14. A method in accordance with claim 13 wherein said modulation/demodulation step, said modem pool control step, and said AAL processing step are performed by a MAP, and said first communication link includes a TDM highway between said MAP and said switch.

15. A method in accordance with claim 14 wherein said second communication link includes an ATM cell bus between said MAP and said AFM.

16. A method in accordance with claim 15 wherein data traffic carried on said ATM cell bus between said AFM and said MAP is addressed using an internal addressing scheme that is internal to said system, and wherein ATM routing is performed in said AFM to translate between said internal addressing scheme and an external addressing scheme shared with said service provider system.

17. A method in accordance with claim 13 wherein said AAL processing step includes tunneling data packets sent from said subscriber equipment to said service provider equipment into a layer 2 tunnel extending through said ATM pipe, and de-tunneling data packets sent from said service provider equipment to said subscriber equipment from said layer 2 tunnel.

18. A method in accordance with claim 11 where said AAL processing step further includes negotiating LCP connections between said modem and said subscriber equipment on said first communication link, and between said modem and said service provider system on said second communication link.

19. A method in accordance with claim 11 wherein said broadband access concentration step includes:
    terminating the LCP protocol of PPP packets carried over said first communication link;
    encapsulating said PPP packets into AAL5 CPCS PDUs;
    segmenting said AAL5 CPCS PDUs into ATM cells;
    addressing said ATM cells to said service provider equipment; and
    placing said addressed ATM cells on said broadband pipe for delivery to said service provider equipment over said second communication link.

20. A method in accordance with claim 11 wherein said broadband access concentration includes:
    terminating the LCP protocol of ATM cells carrying PPP packets over said second communication link;
    assembling said ATM cells into said AAL5 CPCS PDUs;
    unencapsulating said PPP packets from said AAL5 CPCS PDUs; and
    routing said PPP packets to a modem for delivery to said switch and said subscriber equipment over said first communication link.

21. A method for PSTN routing of data packets between a subscriber data processing node and a data network access node while maintaining a PPP connection between said subscriber node and said network access node, comprising the steps of:
    establishing a first communication link using a first link control protocol between said subscriber data processing node and a modem pool associated with a PSTN switch;
    establishing a second communication using a second link control protocol between said network access node and said modem pool;
    a) in an uplink direction from said subscriber node to said network access node:
        receiving said data packets at said PSTN switch;
        delivering said data packets over a TDM highway to a MAP containing said modem pool;
        routing said data packets across a TDM highway fannout to an individual modem in said modem pool assigned to a TDM timeslot that carries said data packets;
        demodulating said data packets as necessary from μlaw/Alaw form to digital form;
        delivering said data packets to a packet segmentation area associated with said modem pool;
        terminating said first communication link by processing said data packets to remove information used for said first link control protocol but not for said second link control protocol;
        encapsulating said data packets into AAL5 CPCS PDUs;
        segmenting said AAL5 CPCS PDUs into ATM cells;
        placing an internal address (VPI/VCI) for said modem and an AFM cell bus ID in the header field of said ATM cells and delivering said ATM cells from said MAP to an AFM;
        re-addressing said ATM cells with an external address (VPI/VCI) to said network access node and placing said ATM cells on an ATM pipe for delivery to said network access node;
    b) in a downlink direction from said network access node to said subscriber node;
        receiving ATM cells from said network access node at said AFM, said ATM cells bearing an external address (VPI/VCI);
        inserting an internal address (VPI/VCI) for said modem in the header field of said ATM cells and delivering said ATM cells from said AFM to said MAP;
        placing said ATM cells in a packet reassembly area associated with said modem pool and reassembling said ATM cells into AAL5 CPCS PDUs;
        unencapsulating data packets from said AAL5 CPCS PDUs;
        processing said data packets to add information used for said first link control protocol but not for said second link control protocol;
        delivering said data packets to an individual modem in said modem pool;
        modulating said data packets as necessary from digital form to ,law/Alaw form;
        routing said data packets across said TDM highway fannout to an individual TDM timeslot assigned to said modem that carries said data packets; and
        delivering said data packets over a TDM highway to said switch.

* * * * *